United States Patent [19]

Olah

[11] Patent Number: 4,798,507

[45] Date of Patent: Jan. 17, 1989

[54] SHEET METAL U-NUT

[75] Inventor: Benjamin Olah, Santa Fe Springs, Calif.

[73] Assignee: California Industrial Products, Inc., Santa Fe Springs, Calif.

[21] Appl. No.: 756,850

[22] Filed: Jul. 18, 1985

[51] Int. Cl.⁴ .................. F16B 37/02; F16B 37/04
[52] U.S. Cl. ......................... 411/175; 411/436; 411/947
[58] Field of Search ............ 411/172, 173, 174, 175, 411/111, 112, 113, 436, 437, 423, 427, 438, 301, 947; 10/152 R

[56] References Cited

U.S. PATENT DOCUMENTS

| | | | |
|---|---|---|---|
| 1,919,940 | 7/1933 | Hall | 10/152 R |
| 2,340,300 | 2/1944 | Booth et al. | 411/436 X |
| 2,384,508 | 9/1945 | Tinnerman | 411/172 |
| 2,404,236 | 7/1946 | Kost | 411/173 |
| 2,560,961 | 7/1951 | Knohl | 411/173 |
| 3,304,980 | 2/1967 | Koehl | 411/173 |
| 3,315,721 | 4/1967 | Koehl | 411/173 |
| 3,331,273 | 7/1967 | Derby | 411/436 |
| 3,426,817 | 2/1969 | Parkin et al. | 411/173 |
| 3,426,818 | 2/1969 | Derby | 411/175 |
| 3,491,646 | 1/1970 | Tinnerman | 411/436 |
| 3,626,733 | 12/1971 | Zook et al. | 10/152 R |
| 4,166,309 | 9/1979 | Schenk | 411/438 |
| 4,396,326 | 8/1983 | McKinnie, III et al. | 411/175 |
| 4,508,477 | 4/1985 | Oehlke et al. | 411/174 |

FOREIGN PATENT DOCUMENTS

| | | | |
|---|---|---|---|
| 0592500 | 2/1978 | U.S.S.R. | 10/152 R |
| 810394 | 3/1959 | United Kingdom | 411/412 |

Primary Examiner—Neill Wilson
Attorney, Agent, or Firm—George J. Netter

[57] ABSTRACT

A nut is provided particularly for use with a sheet metal screw, which nut has a screw-receiving sleeve, with two or more roll-tapped threads having a flattened crest at the apex of the thread angles. An alternate embodiment contemplates providing a double thread on the sleeve inner surface of at least two full revolutions.

1 Claim, 1 Drawing Sheet

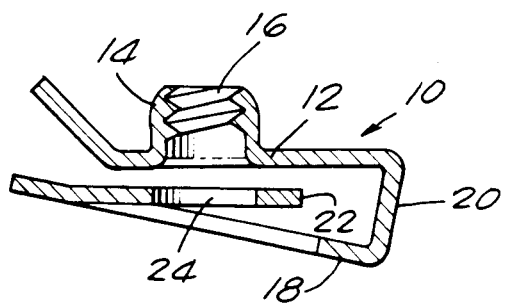
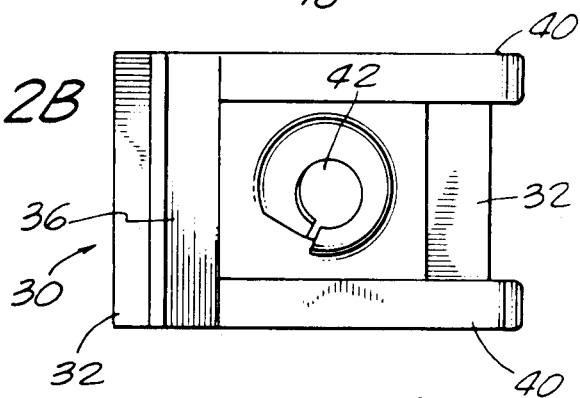
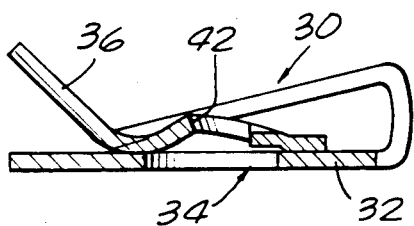
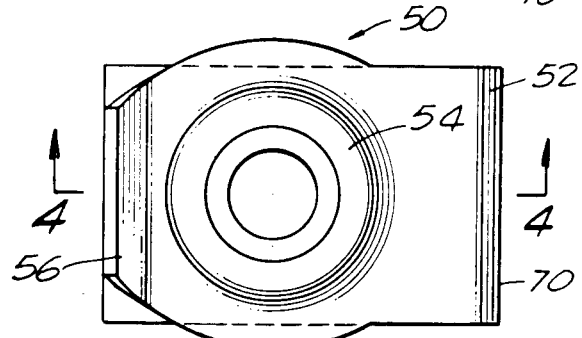
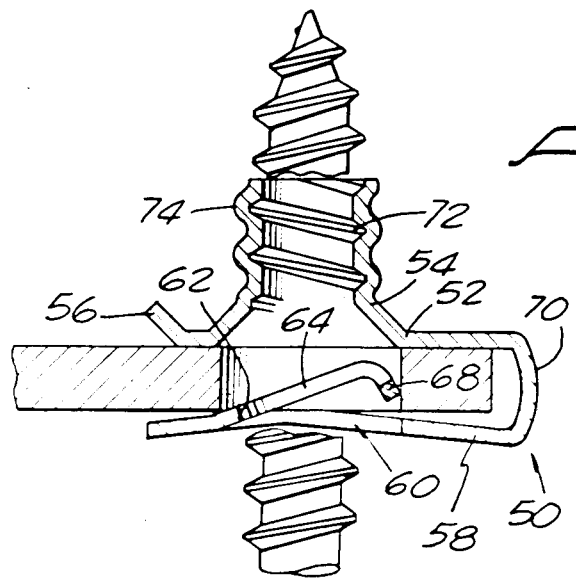
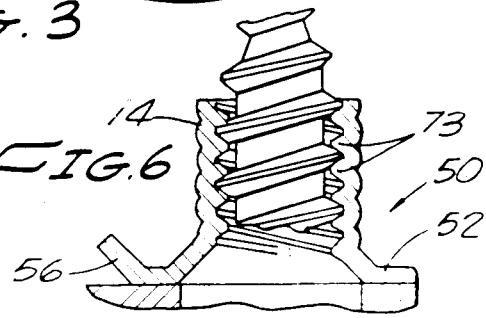
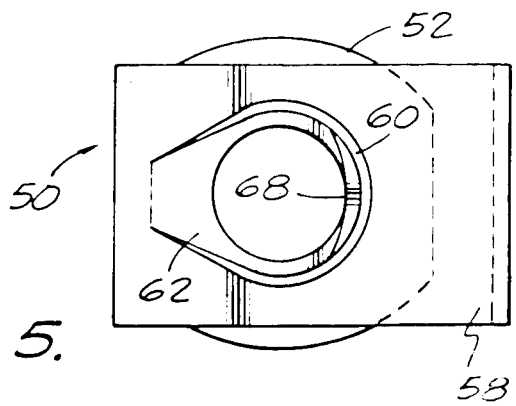

SHEET METAL U-NUT

FIELD OF THE INVENTION

The present invention relates to sheet metal U-nuts of the kind used to join two sheets of metal or a sheet of metal and plastic together by forming a foundation on one of these sheets to anchor a metal screw.

BACKGROUND AND SUMMARY OF THE INVENTION

It is known in the art to use U-nuts to fasten sheets of material, for example, sheet metal or sheet metal and plastic together as is shown, for example, in U.S. Pat. No. 3,426,818 to Derby issued on Feb. 1, 1969, and assigned to the assignee of the present application. There is shown in that patent a U-nut having a sleeve drawn from one portion of the U-nut in which threads are either machined or turned out by a tap in the form of ordinary screw-threads in which the thread angle comes to a point as in an ordinary screw. An example of this prior art is shown in FIG. 1, of the drawings in this application. Also discussed, but not illustrated, in the Derby patent is an example of the prior art shown in FIG. 2 of the present application in which only one thread, or a portion thereof, is formed in the portion of the U-nut containing the sleeve as shown in FIG. 1 of the present application, with, however, no sleeve actually being formed because the single thread does not require a collar.

By far the most commonly used U-nut in the art today is the one shown in FIG. 2 of the present application. This is due in part because of the inexpensive construction and in part because the sheet metal screws commonly in use today, for example in the automobile industry, have a thread shape in which the root of the thread is flattened rather than having the thread angles form a pointed thread at the apex of the thread angles.

Many such sheet metal screws and U-nuts are employed in, for example, the manufacture of an automobile. A problem which exists in the use of the U-nut shown in FIG. 2 is that overtorquing may cause the sheet metal screw to strip because all of the load is carried by one thread engaging the single thread portion of the prior art U-nut. Also, the U-nut itself may be damaged by overtorquing. Such damage to the screw or the U-nut may not be readily apparent but may ultimately result in failure of the screw or the U-nut, causing the panels which are held together thereby to become loosened. External forces, for example, due to vibration of the automobile in operation over time may result in this failure. Often, these U-nuts and screws are used during the assembly of the automobile and in the final assembly are in inaccessible locations in the automobile making replacement with a new screw and/or U-nut a difficult, time-consuming, or impossible task.

It is also desirable in many situations (e.g., automobile construction) to provide a nut for a sheet metal screw that has its cross-section deformed to an out-of-round condition after threading so that a screw threaded into the nut is tightly retained by the clamping effect of the nut. Such an arrangement is frequently referred to by the term "prevailing torque". The prior art nut of FIG. 2 cannot act in this way because only having a single thread leaves it prone to releasing the screw if the applied torque exceeds a specified limit.

The need exists, therefore, for a U-nut which is inexpensive to manufacture, multi-threaded, and adapted to receive the threads of a sheet metal screw having a flattened root on the thread angle. The present invention solves the problems of the prior art with a novel U-nut having a multi-threaded sleeve in which the threads are roll-tapped in a thread configuration to conform to a sheet metal screw having a flattened root. As a further and alternate aspect of the invention, it is contemplated to provide a U-nut for a sheet metal screw in which the U-nut has multiple threads along the nut sleeve for each screw thread.

The above description of the present invention has been summarized in order that the more detailed description which follows may be better understood and the contribution to the art better appreciated. The features of the present invention will be better understood by reference to the detailed description below and the accompanying drawing in which like-referenced numerals have been used to refer to like elements and wherein:

DESCRIPTION OF THE DRAWING

FIG. 1 shows an example of a prior art U-nut having a threaded sleeve with the threads machined or tapped to form a pointed apex of the thread angles;

FIGS. 2A and 2B, in side elevation and top plan respectively, show an example of a prior art nut having a single thread or portion of a single thread with no sleeve or collar;

FIG. 3 shows a top view of a U-nut according to the present invention;

FIG. 4 shows in side view and cross-section taken along lines 4—4 of FIG. 3;

FIG. 5 shows a bottom view of a U-nut according to the present invention.

FIG. 6 depicts in side elevational, sectional, partially fragmentany view an alternate version of the invention.

DESCRIPTION OF PREFERRED EMBODIMENTS

Turning first to FIG. 1, there is shown a prior art U-nut 10 having a first thread receiving portion 12 from which a sleeve or collar 14 is drawn in the manner described in the Derby patent referred to above. The sleeve 14 contains a plurality of threads 16 which are machined or tapped in the interior of the sleeve and are shaped with a pointed apex at the thread angles in the manner of threads adapted to receive an ordinary screw having pointed apexes at the thread angles. The prior art U-nut of FIG. 1 also has a second portion 18 opposing the first portion 12 and connected to the first portion 12 by a hinge portion 20. The prior art U-nut also has a resilient retainer ring 22 partially sheared from the second portion 18 and containing a hole 24 through which the screw is passed into engagement with the threads in the sleeve 14, also in the manner described in the Derby patent.

FIG. 2A illustrates another type of prior art U-nut, which is more commonly in use today. The prior art U-nut 30 shown in FIG. 2A has a first portion 32 containing a hole 34. The U-nut 30 has a second portion 36 from which is sheared a plate 38 leaving a pair of legs 40, one of which is shown in FIGS. 2A and 2B. The plate 38 is stamped to form an opening in the shape of a single helix or a portion thereof 42 which also serves the function of the resilient retainer ring 22 shown in FIG. 1.

Turning now to FIGS. 3 and 4 the improved U-nut of the present invention may be seen. The U-nut 50 has a first thread-receiving portion 52 from which a sleeve 54 is drawn. The sleeve may have a first generally conical portion and a second generally cylindrical portion as is shown in FIG. 4. The first portion 52 of the U-nut is bent outwardly of the opening forming the U of the U-nut 50, with this bent portion 56 serving to facilitate receiving the panel of, for example, sheet metal in the U-nut 50. The U-nut 50 has a second portion 58 containing a hole 60, with the hole 60 being formed by partially shearing away a resilient retainer ring 62 in the manner described in the Derby patent. The retainer ring 62 also has a hole through which the sheet metal screw passes, and is bent at its distal end toward the second portion 58 for the reasons described in the Derby patent. The bend 68 in the free end of the retainer ring 62 is shown in FIG. 5 as well as FIG. 4. The first portion 52 and second portion 58 are connected by a hinge portion 70.

Once the U-nut has been stamped from a single piece of sheet metal, and the retainer ring 62 partially sheared and shaped, and the sleeve 54 drawn, the threads may be tapped in the sleeve either before or after the U-nut is bent into the shape shown in FIG. 4 to form the hinge portion 70. The threads 72 inside the sleeve 74 are formed by a roll-tapping process in which a tap of a shape conforming to sheet metal screws presently being used in conjunction with U-nuts. Such a tool roll-taps threads on the inner surface of the collar which have a flattened crest at the apex of the thread angles.

It will be seen that the present invention comprises a novel U-nut of great utility for serving as an anchor for sheet metal screws of the kind having a flattened root at the thread angles. The U-nut of the present invention is simple to manufacture and with its multiple threaded collar is a great improvement over the prior art U-nut of FIG. 2, which in the past had been used along with sheet metal screws of the kind with which the present invention is most advantageously employed.

Turning now to FIG. 6, there is depicted an alternate embodiment of the present invention. As shown there, the U-nut is provided with a double-thread 73 such that when a screw is threaded therein instead of a flat existing on the nut between adjacent screw threads there is a further thread. The use of a double thread insures against improper, and thus structurally poor, threading. For example, in use of a U-nut in accordance with the first described embodiment, occasionally the screw thread becomes wedged onto the nut flats between threads, rather than within the threads, which can cause breakage of the parts and a poor strength connection. By doubling the nut thread, the probability of cross-threading is substantially reduced.

What is claimed is:

1. A sheet metal U-nut formed from a single flat piece of metal, comprising:

a first portion having a generally cylindrical sleeve drawn therefrom;

a second portion integral with said first portion having a hole formed therein for passage of a sheet metal screw which is aligned with the sleeve centerline axis;

a third portion interconnecting the first and second portions and holding them in spaced apart relation;

a retainer ring partly sheared from the second portion to form the hole in the second portion and angularly bent toward the first portion with its free end formed to extend angularly of the plane of the remainder of the retainer ring;

a double thread formed in the interior of the sleeve for at least two full revolutions by roll-form tapping with a tap having thread shaped with a flattened root at the apex of the tap thread angle.

* * * * *